(12) United States Patent
Sakisaka

(10) Patent No.: US 11,746,714 B2
(45) Date of Patent: Sep. 5, 2023

(54) INTERNAL COMBUSTION ENGINE SYSTEM WITH TEMPERATURE BASED OUTPUT CONTROL

(71) Applicant: IHI Corporation, Tokyo (JP)

(72) Inventor: Ryota Sakisaka, Tokyo (JP)

(*) Notice: Subject to any disclaimer, the term of this patent is extended or adjusted under 35 U.S.C. 154(b) by 133 days.

(21) Appl. No.: 17/378,770

(22) Filed: Jul. 19, 2021

(65) Prior Publication Data

US 2021/0340922 A1 Nov. 4, 2021

Related U.S. Application Data

(63) Continuation of application No. PCT/JP2019/050955, filed on Dec. 25, 2019.

(30) Foreign Application Priority Data

Feb. 1, 2019 (JP) .................................. 2019-016873

(51) Int. Cl.
*F02D 19/06* (2006.01)
*F02D 23/00* (2006.01)

(52) U.S. Cl.
CPC ..... *F02D 19/0607* (2013.01); *F02D 19/0628* (2013.01); *F02D 19/0644* (2013.01);
(Continued)

(58) Field of Classification Search
CPC .............. F02D 19/0607; F02D 19/0644; F02D 19/0671; F02D 23/00
(Continued)

(56) References Cited

U.S. PATENT DOCUMENTS

| 4,033,133 A | 7/1977 | Houseman et al. |
| 2010/0174470 A1* | 7/2010 | Bromberg ........... F02D 19/0644 123/3 |

(Continued)

FOREIGN PATENT DOCUMENTS

| CN | 104919164 | 9/2015 |
| CN | 105134373 | 12/2015 |

(Continued)

OTHER PUBLICATIONS

International Preliminary Report on Patentability with Written Opinion dated Aug. 12, 2021 for PCT/JP2019/050955.
(Continued)

*Primary Examiner* — Erick R Solis
(74) *Attorney, Agent, or Firm* — SOEI PATENT & LAW FIRM

(57) ABSTRACT

An internal combustion engine system includes an internal combustion engine, a turbocharger, and a flow ratio adjustment device including a branch configured to divide the compressed into first compressed air and second compressed air and a valve device configured to adjust a flow rate of the first compressed air and a flow rate of the second compressed air. The system additional includes a reformer configured to discharge first generated as a result of a reaction between the first compressed air and the fuel gas, a junction configured to generate second gas including the first gas and the second compressed air, an air-fuel mixture generator configured to generate an air-fuel mixture including the second gas and the fuel gas, and a controller configured to determining a ratio of the flow rate of the first compressed air based on the temperature of the air-fuel mixture.

20 Claims, 4 Drawing Sheets

(52) U.S. Cl.
CPC ..... *F02D 19/0671* (2013.01); *F02D 19/0678* (2013.01); *F02D 23/00* (2013.01)

(58) Field of Classification Search
USPC .................................. 123/DIG. 12, 3, 559.2
See application file for complete search history.

(56) References Cited

U.S. PATENT DOCUMENTS

| | | | |
|---|---|---|---|
| 2012/0097117 A1* | 4/2012 | Morgenstern | C01B 3/22 |
| | | | 123/3 |
| 2015/0369178 A1 | 12/2015 | Asai | |
| 2017/0051685 A1* | 2/2017 | Scotto | F02M 27/02 |
| 2017/0145966 A1 | 5/2017 | Yao et al. | |
| 2018/0030907 A1 | 2/2018 | Bhosekar et al. | |
| 2019/0301382 A1 | 10/2019 | Asai et al. | |
| 2019/0323458 A1* | 10/2019 | Voice | F02M 26/35 |
| 2020/0182165 A1* | 6/2020 | Kokjohn | F02D 19/0644 |
| 2022/0268200 A1* | 8/2022 | Seba | F02B 43/02 |

FOREIGN PATENT DOCUMENTS

| | | | |
|---|---|---|---|
| JP | S55-007954 | 1/1980 | |
| JP | 2006-037745 | 2/2006 | |
| JP | 2007-002684 | 1/2007 | |
| JP | 2009-150268 | 7/2009 | |
| JP | 2014-136978 | 7/2014 | |
| JP | 2015-218644 | 12/2015 | |
| JP | 2017-133440 | 8/2017 | |
| JP | 2018-009529 | 1/2018 | |
| WO | WO-2011151560 A1 * | 12/2011 | ......... F02D 19/0644 |
| WO | 2014/112489 | 7/2014 | |

OTHER PUBLICATIONS

International Search Report dated Mar. 24, 2020 for PCT/JP2019/050955.

* cited by examiner

INTERNAL COMBUSTION ENGINE SYSTEM WITH TEMPERATURE BASED OUTPUT CONTROL

CROSS-REFERENCE TO RELATED APPLICATIONS

This application is a continuation application of PCT Application No. PCT/JP2019/050955, filed on Dec. 25, 2019, which claims the benefit of priority from Japanese Patent Application No. 2019-016873, filed on Feb. 1, 2019, the entire contents of which are incorporated herein by reference.

BACKGROUND

An air-fuel mixture in which the fuel is leaner than the theoretical air-fuel ratio may be supplied to an internal combustion engine. The air-fuel mixture is then combusted in the internal combustion engine. As a result, the flame temperature during combustion decreases, and nitrogen oxide (NOx) emission can be reduced. Such a combustion condition is referred to as lean-burn. When a three-way catalyst used in automobiles or the like is used in exhaust gas containing a large amount of oxygen discharged by lean-burn, the ability of the three-way catalyst to remove nitrogen oxides is reduced. During a lean-burn, it can be difficult to drive stably as a result of the lean air-fuel mixture. When the fuel is lean, the combustion rate decreases. That is, ignitability of the air-fuel mixture containing fuel and air is reduced. Heat efficiency decreases with the reduction in ignitability, especially, in a reciprocating engine. To compensate for this, hydrogen may be added to the air-fuel mixture to increase the combustion rate. Hydrogen is generated by a so-called fuel reformer. A fuel reformer removes hydrogen by means of a catalyst from a portion of the fuel supplied to an internal combustion engine. For example, U.S. Pat. No. 4,033,133 mixes the hydrogen generated by the reformer with air and fuel in a carburetor. The air-fuel mixture is supplied to the internal combustion engine.

SUMMARY

An example internal combustion engine system includes an internal combustion engine, a turbocharger discharging compressed air using exhaust gas supplied from the internal combustion engine, a reformer discharging a first compressed air-fuel mixture obtained by an exothermic reaction between the compressed air and fuel, and a compressed air-fuel mixture generating part discharging a second compressed air-fuel mixture obtained by mixing the compressed air with the first compressed air-fuel mixture. The compressed air-fuel mixture generating part includes a flow ratio adjusting part configured to receive the compressed air from the turbocharger, and a junction part configured to receive the compressed air from the flow ratio adjusting part and the first compressed air-fuel mixture from the reformer, and to discharge the second compressed air-fuel mixture. The flow ratio adjusting part adjusts a ratio between a flow rate of the compressed air supplied to the junction part and a flow rate of the compressed air supplied to the reformer.

DETAILED DESCRIPTION

Figure 1:
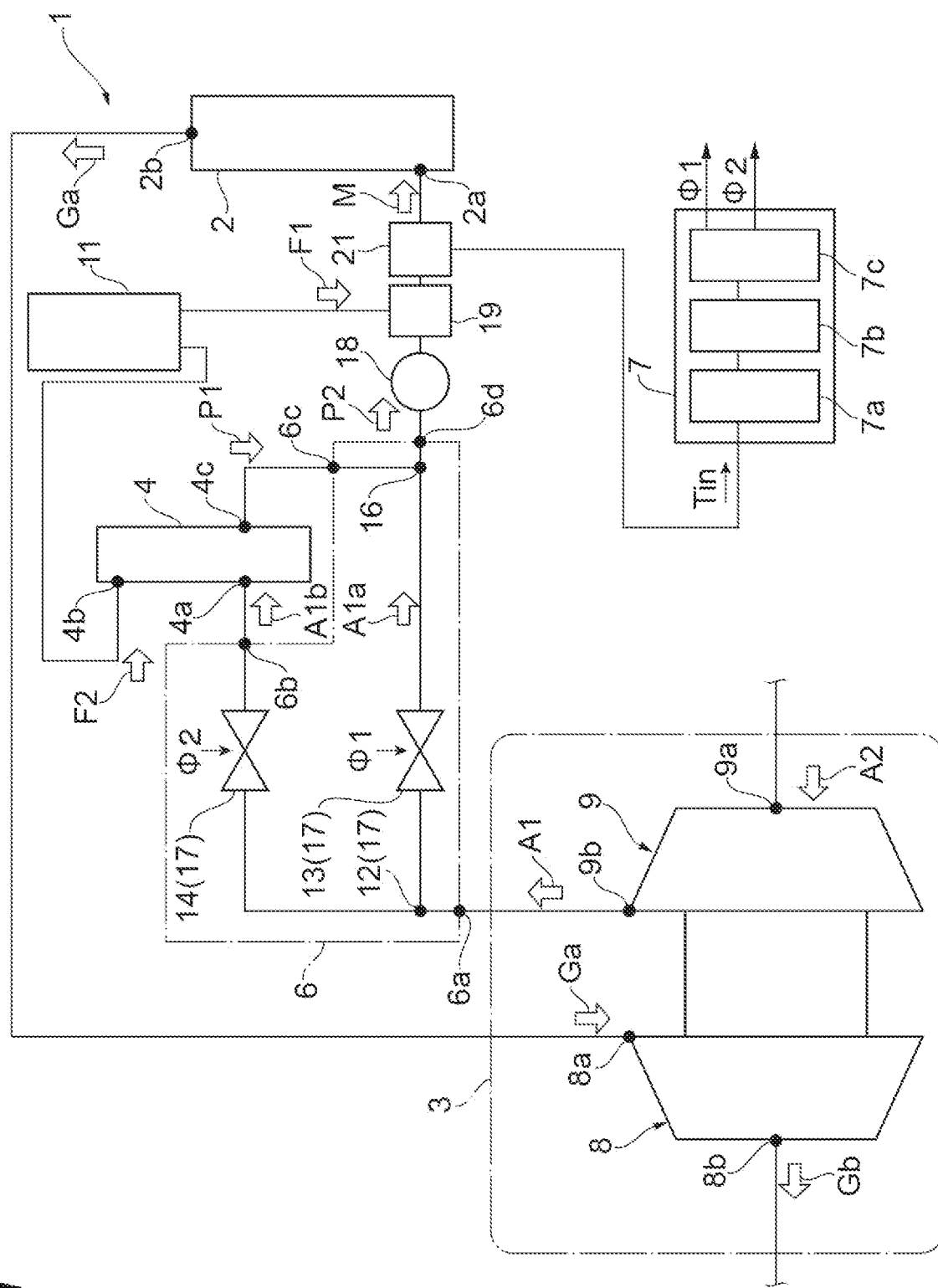
FIG. 1 is a diagram illustrating an example internal combustion engine system.

An example internal combustion engine system includes an internal combustion engine, a turbocharger discharging compressed air using exhaust gas supplied from the internal combustion engine, a reformer discharging a first compressed air fuel mixture obtained by an exothermic reaction between the compressed air and fuel, and a compressed air fuel mixture generating part discharging a second compressed air fuel mixture obtained by mixing the compressed air with the first compressed air fuel mixture. The compressed air fuel mixture generating part includes a flow ratio adjusting part configured to receive the compressed air from the turbocharger, and a junction part configured to receive the compressed air from the flow ratio adjusting part and the first compressed air fuel mixture from the reformer, and to discharge the second compressed air fuel mixture. The flow ratio adjusting part adjusts a ratio between a flow rate of the compressed air supplied to the junction part and a flow rate of the compressed air supplied to the reformer.

The reformer generates hydrogen from the fuel by an exothermic reaction. Heat that is generated is transferred to the compressed air supplied from the turbocharger. The flow ratio adjusting part adjusts the ratio between the flow rate of the compressed air supplied to the junction part and the flow rate of the compressed air supplied to the reformer. A temperature of the first compressed air-fuel mixture discharged from the reformer is controlled by controlling the flow rate of the compressed air supplied to the reformer. As a result, a temperature of the second compressed air-fuel mixture in which the first compressed air-fuel mixture is mixed with the compressed air can also be controlled. The air-fuel mixture that has been controlled to have a temperature for achieving ideal lean-burn can thus be supplied to the internal combustion engine. Consequently, good combustion conditions can be achieved in the internal combustion engine including a stable and continuous lean-burn.

The internal combustion engine system may further include a temperature obtaining part disposed between the compressed air-fuel mixture generating part and the internal combustion engine, and obtaining a temperature of the air-fuel mixture including the second compressed air-fuel mixture flowing between the compressed air-fuel mixture generating part and the internal combustion engine, and a control part controlling the flow ratio adjusting part based on information output from the temperature obtaining part. This configuration enables the temperature of the air-fuel mixture supplied to the internal combustion engine to be brought closer to a target temperature. The temperature of the air-fuel mixture supplied to the internal combustion engine can thus be suitably controlled.

In some examples, the flow ratio adjusting part may include a branch part configured to receive the compressed air from the turbocharger, a first valve connected to the branch part and the junction part, and configured to control the flow rate of the compressed air supplied to the junction part, and a second valve connected to the branch part and the reformer, and configured to control the flow rate of the compressed air supplied to the reformer. This configuration enables the temperature of the air-fuel mixture to be more suitably controlled.

The internal combustion engine system may further include a temperature obtaining part disposed between the compressed air-fuel mixture generating part and the internal combustion engine, and obtaining a temperature of an air-fuel mixture including the second compressed air-fuel mixture flowing between the compressed air-fuel mixture generating part and the internal combustion engine, and a control part controlling the flow ratio adjusting part based on information output from the temperature obtaining part. When the temperature of the air-fuel mixture is higher than a target temperature, the control part may reduce the flow rate of the compressed air supplied from the second valve to the reformer. When the temperature of the air-fuel mixture is lower than the target temperature, the control part may increase the flow rate of the compressed air supplied from the second valve to the reformer. This control enables the temperature of the air-fuel mixture supplied to the internal combustion engine to be further suitably controlled.

The internal combustion engine system may further include a temperature obtaining part disposed between the compressed air-fuel mixture generating part and the internal combustion engine, and obtaining a temperature of an air-fuel mixture including the second compressed air-fuel mixture flowing between the compressed air-fuel mixture generating part and the internal combustion engine, and a control part controlling the turbocharger based on information output from the temperature obtaining part. The turbocharger may include a turbine configured to receive the exhaust gas and generate power, a compressor configured to receive the power and discharge the compressed air, a bypass passage configured to short-circuit a passage connecting the internal combustion engine to the turbine and a discharge part of the turbine, and a wastegate valve formed in the bypass passage. The control part may control the wastegate valve based on the temperature of the air-fuel mixture. The flow rate of the exhaust gas flowing into the bypass passage affects output of the turbine. The output of the turbine affects a pressure ratio of the compressor. The pressure ratio of the compressor affects the temperature of the compressed air discharged from the compressor. The temperature of the compressed air can thus be controlled by controlling the flow rate of the exhaust gas flowing into the bypass passage by a gate valve. As a result, the temperature of the air-fuel mixture supplied to the internal combustion engine can be controlled to a predetermined temperature.

In some examples, the flow ratio adjusting part may include a branch part configured to receive the compressed air from the turbocharger, a first valve connected to the branch part and the junction part, and configured to control the flow rate of the compressed air supplied to the junction part, and a second valve connected to the branch part and the reformer, and configured to control the flow rate of the compressed air supplied to the reformer. When the temperature of the air-fuel mixture is higher than a target temperature, the control part may increase a flow rate of the exhaust gas flowing into the bypass passage, increase the flow rate of the compressed air supplied from the first valve to the junction part, and increase the flow rate of the compressed air supplied from the second valve to the reformer. When the temperature of the air-fuel mixture is lower than the target temperature, the control part may reduce the flow rate of the exhaust gas flowing into the bypass passage, reduce the flow rate of the compressed air supplied from the first valve to the junction part, and reduce the flow rate of the compressed air supplied from the second valve to the reformer. This control enables the temperature of the air-fuel mixture supplied to the internal combustion engine to be more suitably controlled.

In some examples, a surge tank may be provided between the internal combustion engine and the flow ratio adjusting part in order to reduce the effect of pressure variations from the internal combustion engine.

An example method for controlling an internal combustion engine system is disclosed herein. The internal combustion engine system includes an internal combustion engine, a turbocharger discharging compressed air using exhaust gas supplied from the internal combustion engine, and a reformer generating, using the compressed air, a first compressed air-fuel mixture for an air-fuel mixture supplied to the internal combustion engine. The method for controlling an internal combustion engine system may include a first step of obtaining a temperature of the air-fuel mixture, a second step of comparing the temperature of the air-fuel mixture with a target temperature, a third step of reducing a flow rate of the compressed air supplied to the reformer when, as a result of the second step, the temperature of the air-fuel mixture is higher than the target temperature, and a fourth step of increasing the flow rate of the compressed air supplied to the reformer when, as a result of the second step, the temperature of the air-fuel mixture is lower than the target temperature.

The control method may be configured to supply an air-fuel mixture that has been controlled to have a temperature for achieving ideal lean-burn to the internal combustion engine. Good combustion conditions can thus be achieved in the internal combustion engine. In other words, the example method for controlling an internal combustion engine system enables stable and continuous lean-burn.

Additionally, the internal combustion engine system may include a surge tank provided between the internal combustion engine and the reformer.

Another example method for controlling an internal combustion engine system is disclosed herein. The internal combustion engine system includes an internal combustion engine, a turbocharger discharging compressed air using exhaust gas supplied from the internal combustion engine, and having a mechanism for diverting a portion of the exhaust gas, a reformer generating a first compressed air-fuel mixture using the compressed air, and a compressed air-fuel mixture generating part generating, using the compressed air and the first compressed air-fuel mixture, a second compressed air-fuel mixture for an air-fuel mixture supplied to the internal combustion engine. The method for controlling an internal combustion engine system includes a first step of obtaining a temperature of the air-fuel mixture, a second step of comparing the temperature of the air-fuel mixture with a target temperature, a fifth step of performing a control to increase a flow rate of the exhaust gas to be diverted, increase a flow rate of the compressed air supplied to the compressed air-fuel mixture generating part, and increase a flow rate of the compressed air supplied to the reformer when, as a result of the second step, the temperature of the air-fuel mixture is higher than the target temperature, and a sixth step of performing a control to reduce the flow rate of the exhaust gas to be diverted, reduce the flow rate of the compressed air supplied to the compressed air-fuel mixture generating part, and reduce the flow rate of the compressed air supplied to the reformer when, as a result of the second step, the temperature of the air-fuel mixture is lower than the target temperature. These steps control the flow rate of the exhaust gas flowing into the bypass passage by the gate valve. As a result, the temperature of the compressed air can be controlled. The temperature of the air-fuel mixture supplied to the internal combustion engine can thus be controlled to a predetermined temperature.

Additionally, the internal combustion engine system may include a surge tank provided between the internal combustion engine and the compressed air-fuel mixture generating part.

Hereinafter, with reference to the drawings, the same elements or similar elements having the same function are denoted by the same reference numerals, and redundant description will be omitted.

An example internal combustion engine system 1 illustrated in FIG. 1 is used as a power source for a generator. The internal combustion engine system 1 is also used as a power source for a mobile object. Examples of the mobile object that receives power from the internal combustion engine system 1 include a vehicle, a ship, and other types of propelled objects.

The internal combustion engine system 1 includes an internal combustion engine 2, a turbocharger 3, a reformer 4, a compressed air-fuel mixture generator 6 (compressed air-fuel mixture generating part), and a controller 7 (control part). The internal combustion engine system 1 may include other components.

The turbocharger 3 is operated by exhaust gas Ga of the internal combustion engine 2. A portion of compressed air A1 (compressed air A1b) discharged from the turbocharger 3 is supplied to the reformer 4. As a result, a first compressed air-fuel mixture P1 containing air and hydrogen is formed. The first compressed air-fuel mixture P1 is mixed with fuel F1 in an air-fuel mixture generating part 19 described below. Gas including the first compressed air-fuel mixture P1 and fuel F1 is an air-fuel mixture M. The air-fuel mixture M is supplied to the internal combustion engine 2.

The air-fuel mixture generating part 19 discharges the air-fuel mixture M. The air-fuel gas ratio of the air-fuel mixture M is leaner than the theoretical air-fuel ratio. That is, combusting the air-fuel mixture M causes lean-burn. The air-fuel mixture M contains the hydrogen generated by the reformer 4. The air-fuel mixture M that contains the hydrogen therefore achieves good combustion conditions even if the air-fuel mixture M has an air-fuel gas ratio that causes lean-burn.

The temperature of the air-fuel mixture M may also be controlled in order to achieve good combustion conditions. For example, the ratio of the components of the air-fuel mixture M and the temperature of the air-fuel mixture M are controlled to satisfy predetermined conditions in order to achieve good combustion conditions. In some examples, the internal combustion engine system 1 does not include a thermal control element such as a heater or a cooler for adjusting the temperature of the air-fuel mixture M. The internal combustion engine system 1 supplies the air-fuel mixture M that is controlled to a predetermined temperature without having a thermal control element. Additional details of the internal combustion engine system 1 will be described below.

The internal combustion engine 2 has an internal combustion engine inlet 2a and an internal combustion engine outlet 2b. The internal combustion engine inlet 2a receives the air-fuel mixture M. The internal combustion engine inlet 2a is connected to the compressed air-fuel mixture generator 6 via several components. The internal combustion engine outlet 2b discharges the exhaust gas Ga. The internal combustion engine outlet 2b is connected to the turbocharger 3.

The turbocharger 3 has a turbine 8 and a compressor 9. The turbine 8 has a turbine inlet 8a and a turbine outlet 8b. The turbine inlet 8a is connected to the internal combustion engine outlet 2b. The turbine 8 receives the exhaust gas Ga from the turbine inlet 8a. The turbine 8 generates power to drive the compressor 9. Exhaust gas Gb is discharged from the turbine outlet 8b. The compressor 9 has a compressor inlet 9a and a compressor outlet 9b. The compressor outlet 9b is connected to the compressed air-fuel mixture generator 6. The compressor 9 receives atmospheric pressure air A2 from the compressor inlet 9a. The compressor 9 compresses the air A2 using the power supplied from the turbine 8. The compressed air A1 is discharged from the compressor outlet 9b.

The reformer 4 has a first reformer inlet 4a, a second reformer inlet 4b, and a reformer outlet 4c. The first reformer inlet 4a is connected to the compressed air-fuel mixture generator 6. The second reformer inlet 4b is connected to a fuel supply 11 (fuel supply part). The reformer outlet 4c is connected to the compressed air-fuel mixture generator 6. The reformer 4 receives the compressed air A1b from the first reformer inlet 4a. The reformer 4 receives fuel F2 from the second reformer inlet 4b. The reformer 4 causes the compressed air A1b and fuel F2 to react with each other. Hydrogen is generated as a result. In some examples, the reformer 4 causes oxygen in the compressed air A1b and the fuel F2 to be catalytically reacted. Carbon monoxide and hydrogen are generated as a result of this reaction. This reaction is an exothermic reaction. The reformer 4 discharges the first compressed air-fuel mixture P1 from the reformer outlet 4c. The first compressed air-fuel mixture P1 contains compressed air and hydrogen. It should be noted that the reformer 4 may use a device configured to generate hydrogen by an exothermic reaction, as appropriate.

The compressed air-fuel mixture generator 6 has a first generator inlet 6a, a first generator outlet 6b, a second generator inlet 6c, and a second generator outlet 6d. The first generator inlet 6a is connected to the compressor outlet 9b. The first generator outlet 6b is connected to the first reformer inlet 4a. The second generator inlet 6c is connected to the reformer outlet 4c. The second generator outlet 6d is connected to the internal combustion engine inlet 2a via several components.

The compressed air-fuel mixture generator 6 receives the compressed air A1 from the first generator inlet 6a. The compressed air-fuel mixture generator 6 discharges the compressed air A1b from the first generator outlet 6b. The compressed air-fuel mixture generator 6 receives the first compressed air-fuel mixture P1 from the second generator inlet 6c. The compressed air-fuel mixture generator 6 discharges a second compressed air-fuel mixture P2 from the second generator outlet 6d.

The compressed air-fuel mixture generator 6 has a branch 12 (branch part), a first valve 13, a second valve 14, and a junction 16 (junction part). The branch 12 is connected to the first generator inlet 6a. The branch part 12 is connected upstream of the first valve 13. The branch part 12 is connected upstream of the second valve 14. The first valve 13 is connected to the branch part 12. The first valve 13 is connected to the junction part 16. The second valve 14 is connected to the branch part 12. The second valve 14 is connected to the first generator outlet 6b. The junction part 16 is connected to the first valve 13. The junction part 16 is connected to the second generator inlet 6c. The junction part 16 is connected to the second generator outlet 6d.

The branch part 12 distributes the compressed air A1 between the first valve 13 and second valve 14. The first valve 13 controls a flow rate of compressed air A1a that flows from the branch part 12 to the junction part 16. The second valve 14 controls a flow rate of the compressed air A1b that flows from the branch part 12 to the first generator outlet 6b. The second valve 14 controls the flow rate of the compressed air A1b supplied to the reformer 4. The first valve 13 and second valve 14 adjust the ratio between the flow rate of the compressed air A1a supplied to the junction part 16 and the flow rate of the compressed air A1b supplied to the reformer 4. The branch part 12, first valve 13, and second valve 14 form a flow ratio adjustment device 17 (adjusting part). The junction part 16 mixes the first compressed air-fuel mixture P1 received from the second generator inlet 6c with a portion of the compressed air A1 being the compressed air A1a supplied from the branch part 12 via the first valve 13.

The internal combustion engine system 1 includes a surge tank 18, the air-fuel mixture generating part 19, and a temperature sensor 21. The surge tank 18, air-fuel mixture generating part 19, and temperature sensor 21 are disposed between the compressed air-fuel mixture generator 6 and internal combustion engine 2. In the example shown in FIG. 1, the surge tank 18, air-fuel mixture generating part 19, and temperature sensor 21 are disposed in order along a direction from the compressed air-fuel mixture generator 6 toward the internal combustion engine 2. The surge tank 18 suppresses upstream transmission of the effect of pressure variations in the internal combustion engine 2. That is, the surge tank 18 suppresses the transmission of the effect of pressure variations in the internal combustion engine 2 to the compressed air-fuel mixture generator 6. It should be noted that the surge tank 18 may be provided as required. The surge tank 18 may be omitted. The air-fuel mixture generating part 19 receives the second compressed air-fuel mixture P2 and fuel F1. The air-fuel mixture generating part 19 generates the air-fuel mixture M. The temperature sensor 21 obtains a gas temperature (Tin) of the air-fuel mixture M. The temperature sensor 21 obtains the gas temperature (Tin) of gas that flows into the internal combustion engine inlet 2a.

The internal combustion engine system 1 includes the controller 7. The controller 7 controls the gas temperature (Tin) of the air-fuel mixture M supplied to the internal combustion engine inlet 2a to a target temperature (Ttr). This control includes a first mode and a second mode. The first mode maintains the gas temperature (Tin) at the target temperature (Ttr). The second mode brings the gas temperature (Tin) closer to the target temperature (Ttr). The gas temperature (Tin) is controlled by an operation of the compressed air-fuel mixture generator 6. The controller 7 controls the operation of the compressed air-fuel mixture generator 6. As a result, the air-fuel mixture M of the target temperature (Ttr) is generated.

The controller 7 generates a control signal on the basis of temperature information. The control signal is for controlling the compressed air-fuel mixture generator 6. The controller 7 includes a temperature obtaining part 7a, a temperature comparing part 7b, and a control signal generating part 7c, as functional elements. These elements will be described in additional detail below when describing the control performed by the controller 7.

The controller 7 controls the flow rate of the compressed air A1a. The compressed air A1a is supplied from the branch part 12 to the junction part 16. The controller 7 controls the flow rate of the compressed air A1a by adjusting an opening degree of the first valve 13. The controller 7 controls the flow rate of the compressed air A1b. The compressed air A1b is supplied from the branch part 12 to the reformer 4. The controller 7 controls the flow rate of the compressed air A1b by adjusting an opening degree of the second valve 14. The controller 7 generates a control signal φ1 to be provided to the first valve 13 and a control signal φ2 to be provided to the second valve 14. The controller 7 provides the control signal φ1 to the first valve 13. The controller 7 provides the control signal φ2 to the second valve 14. An example operation of the controller 7 will be described below.

The controller 7 includes as hardware, for example, any suitable processor such as a central processing unit (CPU), or specialized processors (for example, a digital signal processor (DSP)) for different tasks. The controller 7 may include a read-only memory (ROM) or a random-access memory (RAM), for example, to perform processing.

Figure 2:
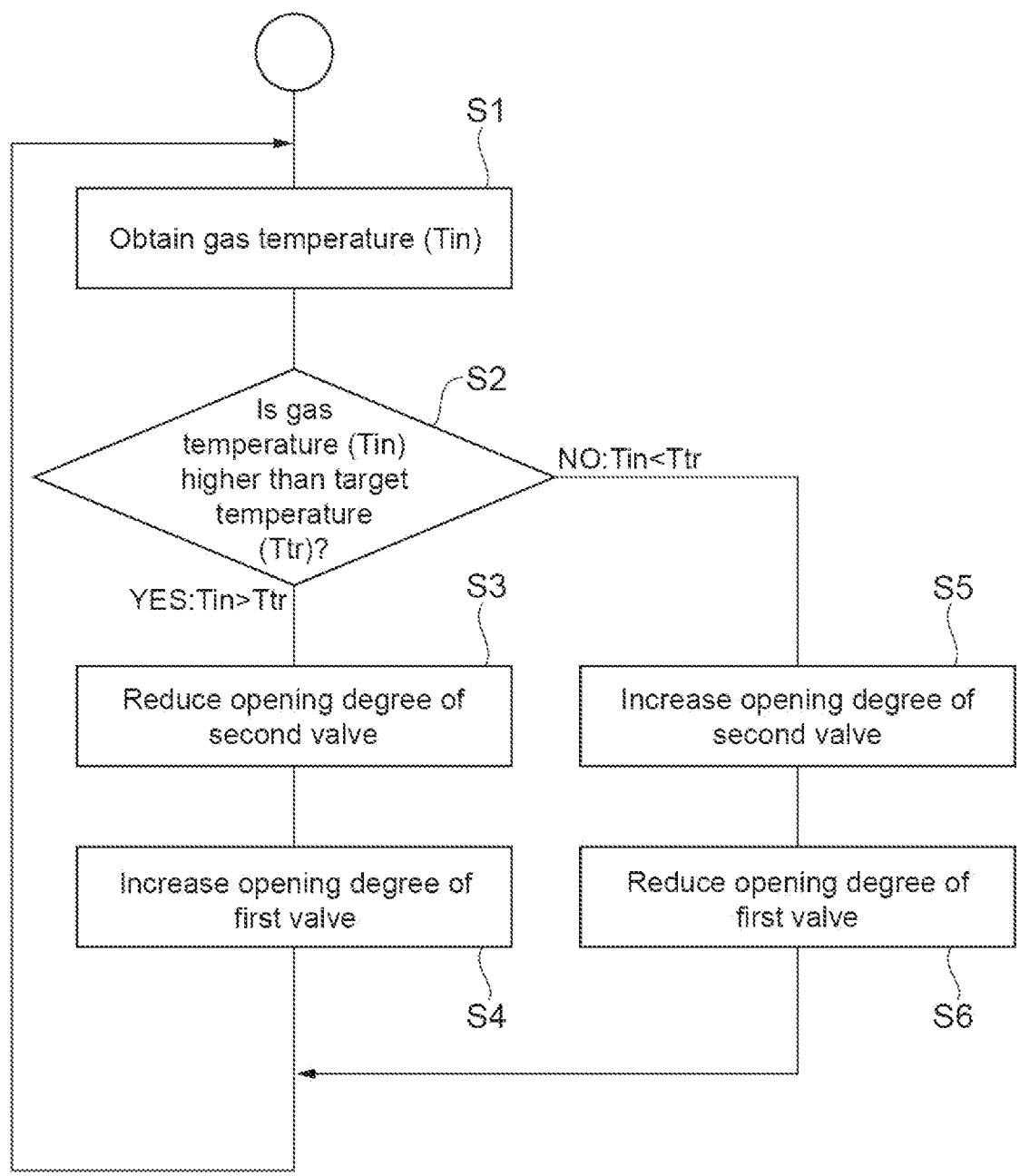
FIG. 2 is a flow chart illustrating an example operation performed by an engine system controller.

An example method for controlling the internal combustion engine system 1 is performed by the controller 7. The control performed by the controller 7 will be described in detail below with reference to the flow chart of FIG. 2.

The controller 7 obtains the gas temperature (Tin) (step S1: first step). Step S1 is performed by the temperature sensor 21 and temperature obtaining part 7a.

Next, the controller 7 compares the gas temperature (Tin) with the target temperature (Ttr) (step S2: second step). Step S2 is performed by the temperature comparing part 7b. At step S2, it is determined whether the gas temperature (Tin) is higher than the target temperature (Ttr). At step S2, it may be determined whether the gas temperature (Tin) is lower than the target temperature (Ttr).

When the gas temperature (Tin) is higher than the target temperature (Ttr) (step S2: YES), the controller 7 controls the compressed air-fuel mixture generator 6 to lower the gas temperature (Tin). The gas temperature (Tin) can be controlled by a temperature (T2) of the first compressed air-fuel mixture P1 discharged from the reformer 4. The temperature (T2) of the first compressed air-fuel mixture P1 is higher than a temperature (T1) of the compressed air A1a (T2>T1). The compressed air A1a flows from the branch part 12 to the junction part 16 via the first valve 13.

The temperature (T2) of the first compressed air-fuel mixture P1 can be controlled by the flow rate of the compressed air A1b supplied to the reformer 4. The controller 7 reduces the flow rate of the compressed air A1b (third step). The compressed air A1b is supplied to the reformer 4. In some examples, the controller 7 reduces the opening degree of the second valve 14 (step S3). the controller 7 may be configured to maintain predetermined operating conditions for the flow rate and pressure of the second compressed air-fuel mixture P2 discharged from the compressed air-fuel mixture generator 6. When the flow rate of the compressed air A1b supplied to the reformer 4 is reduced, the controller 7 increases the flow rate of the compressed air A1a to maintain those conditions. The compressed air A1a is supplied from the branch part 12 to the junction part 16. In some examples, the controller 7 increases the opening degree of the first valve (step S4). That is, the third step includes step S3 and step S4.

When the gas temperature (Tin) is lower than the target temperature (Ttr) (step S2: NO), the controller 7 controls the compressed air-fuel mixture generator 6 to raise the gas temperature (Tin). The controller 7 increases the flow rate of the compressed air A1b (fourth step). The compressed air A1b is supplied to the reformer 4. In some examples, the controller 7 increases the opening degree of the second valve 14 (step S5). Additionally, the controller 7 reduces the flow rate of the compressed air A1a supplied from the branch part 12 to the junction part 16. In some examples, the controller 7 reduces the opening degree of the first valve (step S6). That is, the fourth step includes step S5 and step S6.

Of the two passages from the branch part 12 to the junction part 16, a pressure loss in the passage that includes the first valve 13 is greater than a pressure loss in the passage that includes the second valve 14. That is, the total pressure loss maintains a predetermined state. This setting enables a pressure difference to be reduced between a pressure of the compressed air A1$a$ and a pressure of the first compressed air fuel mixture P1. The compressed air A1$a$ is supplied from the first valve 13. The first compressed air-fuel mixture P1 is supplied from the reformer 4. The compressed air A1$a$ and first compressed air-fuel mixture P1 can thus be suitably joined at the junction part 16.

The controller 7 then performs step S1 again. In other words, the controller 7 repeats the control above during operation of the internal combustion engine system 1.

The operation and effects of the example internal combustion engine system 1 will now be described.

The reformer 4 causes hydrogen to be generated from the fuel F2 by an exothermic reaction. Heat that is generated is transferred to the compressed air A1$b$ supplied from the turbocharger 3. The temperature (T1) of the first compressed air-fuel mixture P1 discharged from the reformer 4 is controlled by controlling the flow rate of the compressed air A1$b$ supplied to the reformer 4. As a result, a temperature (T3) of the second compressed air-fuel mixture P2 in which the first compressed air-fuel mixture P1 is mixed with the compressed air A1$a$ can be controlled. The air-fuel mixture M that has been controlled to have a temperature for achieving ideal lean-burn is thus supplied to the internal combustion engine 2. Consequently, good combustion conditions can be achieved in the internal combustion engine 2. As a result, the properties of the exhaust gas can be improved.

In some examples, the internal combustion engine system 1 does not require a cooling device or a heating device to control the gas temperature (Tin). The internal combustion engine system 1 can thus have a simple configuration. An exhaust gas temperature may be used for the control instead of the gas temperature (Tin). Information on oxygen concentration of the exhaust gas may also be used for the control. A control using the oxygen concentration information may therefore be configured to detect a misfire and contribute to stable driving.

The example internal combustion engine system 1 may be applied to a device which requires a relatively constant output from the internal combustion engine 2. In this case, variation in the air flow rate is small, which enables good control. For example, a generator has a small output variation and operates at steady state. The internal combustion engine system 1 can be suitably used for a generator. There is also a device in which the air-fuel mixture temperature continually changes until steady state upon start-up. The internal combustion engine system 1 can be suitably used for a device that repeats starting and stopping, such as an emergency generator.

It is to be understood that not all aspects, advantages and features described herein may necessarily be achieved by, or included in, any one particular example. Indeed, having described and illustrated various examples herein, it should be apparent that other examples may be modified in arrangement and detail.

Figure 3:
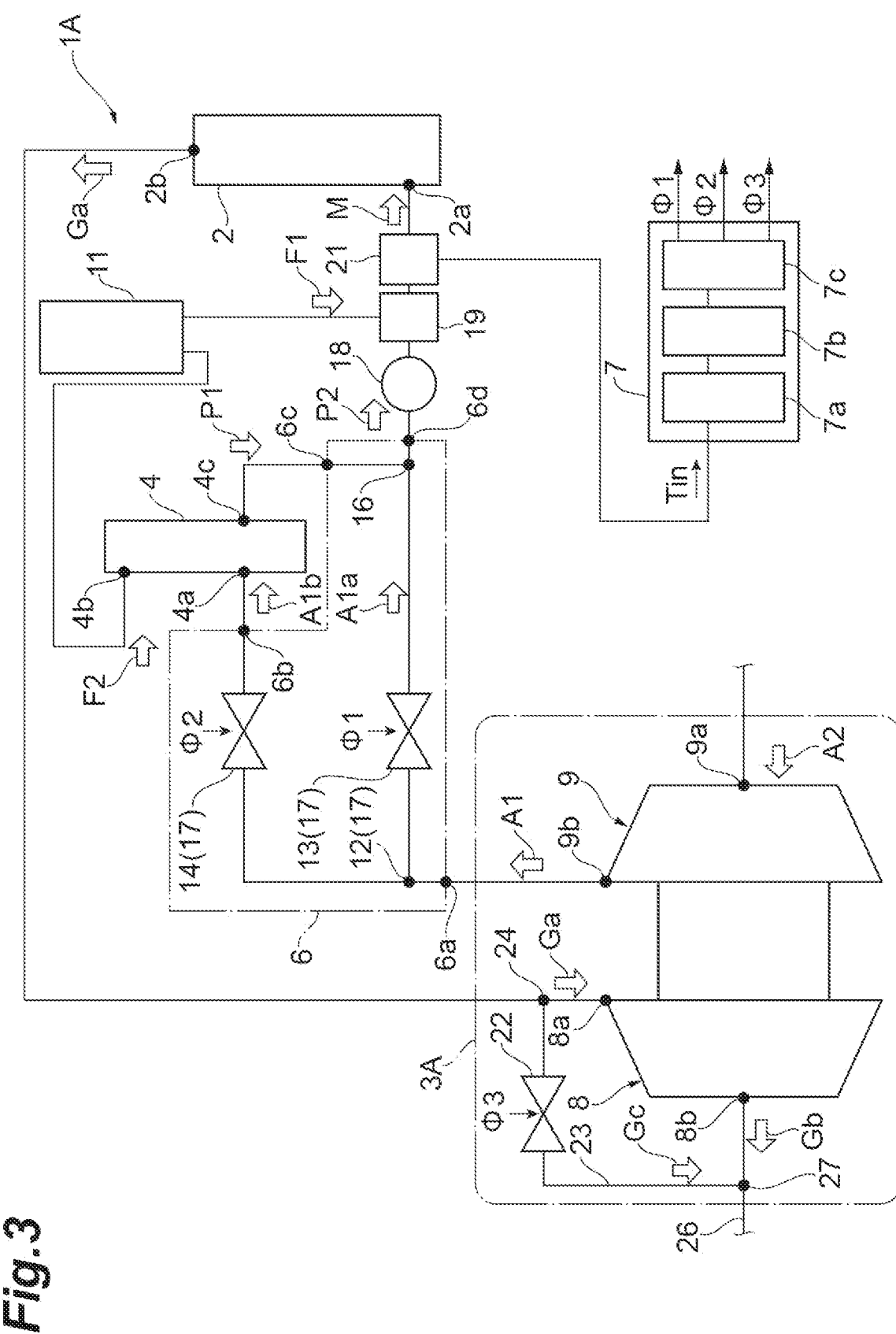
FIG. 3 is a diagram illustrating another example internal combustion engine system.

For example, an internal combustion engine system 1A shown in FIG. 3 includes a turbocharger 3A instead of the turbocharger 3. The controller 7 further outputs a control signal φ3 in addition to the control signals φ1 and φ2. A detailed explanation of configurations of the internal combustion engine system 1A that are the same as those of the internal combustion engine system 1 is omitted.

The turbocharger 3A has a so-called wastegate valve (hereinafter, "wastegate valve 22"). The wastegate valve 22 is formed in a bypass passage 23. The bypass passage 23 inhibits the flow of a portion of the exhaust gas Ga of the internal combustion engine 2 into the turbine 8. The bypass passage 23 guides a portion of the exhaust gas Ga to the turbine outlet 8$b$. The wastegate valve 22 and bypass passage 23 divert a portion of the exhaust gas Ga. This configuration enables a flow rate of the exhaust gas Ga supplied to the turbine 8 to be controlled. The balance between the power generated by the turbine 8 and the power required by the compressor 9 can thus be adjusted. The internal combustion engine system 1A including the turbocharger 3A can also be used for a device which focuses on so-called start-up characteristics (for example, a vehicle).

One end of the bypass passage 23 is connected to an upstream branch part 24. The upstream branch part 24 is formed in a passage that connects the internal combustion engine outlet 2$b$ to the turbine inlet 8$a$. The other end of the bypass passage 23 is connected to a downstream branch part 27. The downstream branch part 27 is formed in a discharge passage 26 (discharge part) which is connected to the turbine outlet 8$b$. The wastegate valve 22 is connected to the bypass passage 23 between the upstream branch part 24 and downstream branch part 27. The wastegate valve 22 controls a flow rate of exhaust gas Gc. The exhaust gas Gc flows from the upstream branch part 24 to the downstream branch part 27. Control of the wastegate valve 22 is based on the control signal φ3 provided from the controller 7.

Figure 4:
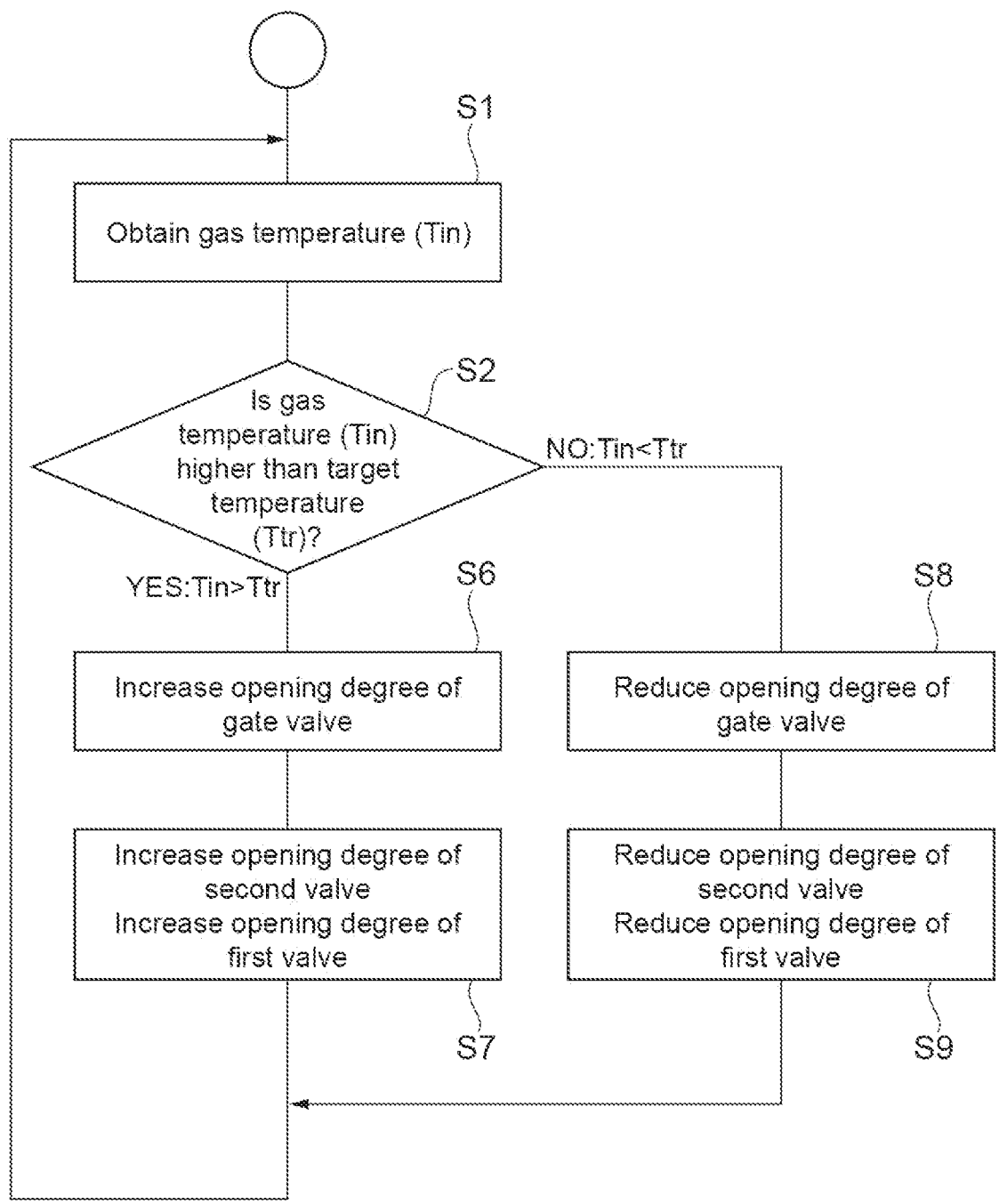
FIG. 4 is a flow chart illustrating another example operation performed by an engine system controller.

The controller 7 controls an opening degree of the wastegate valve 22 on the basis of the gas temperature (Tin). For example, as shown in FIG. 4, when the gas temperature (Tin) is higher than the target temperature (Ttr) (step S2: YES), the controller 7 increases the flow rate of the diverted exhaust gas Gc. The controller 7 also increases the flow rate of the compressed air A1$a$ supplied to the junction part 16 of the compressed air-fuel mixture generator 6. Additionally, the controller 7 increases the flow rate of the compressed air A1$b$ supplied to the reformer 4. These three controls form a fifth step. In some examples, the controller 7 increases the opening degree of the wastegate valve 22 (step S6). When the opening degree of the wastegate valve 22 is increased, an increased amount of the exhaust gas G flows into the bypass passage 23, and the flow rate of the exhaust gas Ga supplied to the turbine 8 is reduced. As a result, the power generated at the turbine 8 is reduced. In other words, the pressure ratio of the compressor 9 is reduced. The temperature of the compressed air A1 discharged from the compressor outlet 9$b$ is thus lowered. It should be noted that, in this case, the opening degree of the first valve 13 and the opening degree of the second valve 14 may be increased to maintain the air-fuel mixture M at a predetermined pressure (step S7). That is, the fifth step includes step S6 and step S7.

When the gas temperature (Tin) is lower than the target temperature (Ttr), the controller 7 reduces the flow rate of the diverted exhaust gas Gc. The controller 7 also reduces the flow rate of the compressed air A1$a$ supplied to the junction part 16 of the compressed air-fuel mixture generator 6. Additionally, the controller 7 reduces the flow rate of the compressed air A1$b$ supplied to the reformer 4. These three controls form a sixth step. In some examples, the controller 7 reduces the opening degree of the wastegate valve 22 (step S8). When the opening degree of the wastegate valve 22 is reduced, an increased amount of the exhaust gas Ga flows into the turbine 8. As a result, the power generated at the turbine 8 is increased, and the pressure ratio of the compressor 9 is increased. The temperature of the compressed air A1 discharged from the compressor outlet 9b is thus raised. It should be noted that, in this case, the opening degree of the first valve 13 and the opening degree of the second valve 14 may be reduced to maintain the air-fuel mixture M at a predetermined pressure (step S9). That is, the sixth step includes step S8 and step S9.

The first valve 13 may be connected to the turbocharger 3 and branch part 12. The second valve 14 may be connected to the reformer 4 and junction part 16.

The invention claimed is:

1. An internal combustion engine system comprising:
    an internal combustion engine;
    a turbocharger configured to discharge compressed air using exhaust gas supplied from the internal combustion engine;
    a flow ratio adjustment device including a branch configured to divide the compressed air received from the turbocharger into first compressed air and second compressed air, the flow ratio adjustment device further including a valve configured to adjust a flow rate of the first compressed air and a flow rate of the second compressed air;
    a reformer configured to receive the first compressed air and fuel gas and discharge first gas including heat and hydrogen generated as a result of an exothermic reaction between the first compressed air and the fuel gas;
    a junction configured to receive the first gas from the reformer and receive the second compressed air from the valve to generate second gas including the first gas and the second compressed air;
    an air-fuel mixture generator configured to receive the second gas and receive the fuel gas to generate an air-fuel mixture including the second gas and the fuel gas;
    a temperature sensor configured to measure a temperature of the air-fuel mixture; and
    a controller configured to output, to the flow ratio adjustment device, a control signal for determining a ratio of the flow rate of the first compressed air supplied to the reformer based on the temperature of the air-fuel mixture.

2. The internal combustion engine system according to claim 1, wherein the controller is configured to:
    output the control signal for reducing the flow rate of the first compressed air to the flow ratio adjustment device when the temperature of the air-fuel mixture is higher than a target temperature; and
    output the control signal for increasing the flow rate of the first compressed air to the flow ratio adjustment device when the temperature of the air-fuel mixture is lower than the target temperature.

3. The internal combustion engine system according to claim 2, wherein the controller is further configured to:
    output the control signal for increasing the flow rate of the second compressed air to the flow ratio adjustment device when the temperature of the air-fuel mixture is higher than the target temperature; and
    output the control signal for reducing the flow rate of the second compressed air to the flow ratio adjustment device when the temperature of the air-fuel mixture is lower than the target temperature.

4. The internal combustion engine system according to claim 1, wherein the flow ratio adjustment device includes:
    a first valve connected to the branch and the reformer, and configured to adjust the flow rate of the first compressed air supplied to the reformer by receiving the control signal from the controller; and
    a second valve connected to the branch and the junction, and configured to adjust the flow rate of the second compressed air supplied to the junction by receiving the control signal from the controller.

5. The internal combustion engine system according to claim 4, wherein the controller is configured to:
    output the control signal for reducing an opening degree of the first valve to the flow ratio adjustment device when the temperature of the air-fuel mixture is higher than a target temperature; and
    output the control signal for increasing the opening degree of the first valve to the flow ratio adjustment device when the temperature of the air-fuel mixture is lower than the target temperature.

6. The internal combustion engine system according to claim 5, wherein the controller is configured to:
    output the control signal for increasing an opening degree of the second valve to the flow ratio adjustment device when the temperature of the air-fuel mixture is higher than the target temperature; and
    output the control signal for reducing the opening degree of the second valve to the flow ratio adjustment device when the temperature of the air-fuel mixture is lower than the target temperature.

7. The internal combustion engine system according to claim 1, wherein the temperature sensor is disposed between the air-fuel mixture generator and the internal combustion engine.

8. The internal combustion engine system according to claim 1, wherein a surge tank is provided between the junction and the air-fuel mixture generator.

9. The internal combustion engine system according to claim 1, wherein the air-fuel mixture includes hydrogen generated by the reformer, the compressed air, and the fuel gas, and
    wherein a ratio between the compressed air and the fuel gas included in the air-fuel mixture is lower than a theoretical air-fuel ratio.

10. An internal combustion engine system comprising:
    an internal combustion engine;
    a turbocharger including a turbine configured to receive exhaust gas supplied from the internal combustion engine and generate power, a compressor configured to receive the power and discharge compressed air, and a gate valve formed in a bypass passage to guide the exhaust gas to a discharge passage connected to an outlet of the turbine;
    a flow ratio adjustment device including a branch configured to divide the compressed air received from the turbocharger into first compressed air and second compressed air;
    a reformer configured to receive the first compressed air and fuel gas and discharge first gas including heat and hydrogen generated as a result of an exothermic reaction between the first compressed air and the fuel gas;
    a junction configured to receive the first gas from the reformer and receive the second compressed air to generate second gas including the first gas and the second compressed air;
    an air-fuel mixture generator configured to receive the second gas and receive the fuel gas to generate an air-fuel mixture including the second gas and the fuel gas;

a temperature sensor configured to measure a temperature of the air-fuel mixture; and a controller configured to output, to the gate valve, a control signal for determining an opening degree of the gate valve based on the temperature of the air-fuel mixture.

11. The internal combustion engine system according to claim 10, wherein the controller outputs the control signal for increasing the opening degree of the gate valve to the gate valve when the temperature of the air-fuel mixture is higher than a target temperature, and outputs the control signal for reducing the opening degree of the gate valve to the gate valve when the temperature of the air-fuel mixture is lower than the target temperature.

12. The internal combustion engine system according to claim 11, wherein the flow ratio adjustment device further includes a valve device configured to adjust a flow rate of the first compressed air and a flow rate of the second compressed air.

13. The internal combustion engine system according to claim 12, wherein the controller outputs the control signal for increasing the flow rate of the first compressed air and for increasing the flow rate of the second compressed air to the flow ratio adjustment device when the temperature of the air-fuel mixture is higher than the target temperature.

14. The internal combustion engine system according to claim 13, wherein the controller outputs the control signal for reducing the flow rate of the first compressed air and for reducing the flow rate of the second compressed air to the flow ratio adjustment device when the temperature of the air-fuel mixture is lower than the target temperature.

15. The internal combustion engine system according to claim 12, wherein the flow ratio adjustment device includes:
a first valve connected to the branch and the reformer, and configured to adjust the flow rate of the first compressed air supplied to the reformer by receiving the control signal from the controller, and a second valve connected to the branch and the junction, and configured to adjust the flow rate of the second compressed air supplied to the junction by receiving the control signal from the controller.

16. The internal combustion engine system according to claim 15, wherein the controller outputs the control signal for reducing an opening degree of the first valve to the flow ratio adjustment device when the temperature of the air-fuel mixture is higher than the target temperature, and outputs the control signal for increasing the opening degree of the first valve to the flow ratio adjustment device when the temperature of the air-fuel mixture is lower than the target temperature.

17. The internal combustion engine system according to claim 16, wherein the controller outputs the control signal for increasing an opening degree of the second valve to the flow ratio adjustment device when the temperature of the air-fuel mixture is higher than the target temperature, and outputs the control signal for reducing the opening degree of the second valve to the flow ratio adjustment device when the temperature of the air-fuel mixture is lower than the target temperature.

18. The internal combustion engine system according to claim 10, wherein the temperature sensor is disposed between the air-fuel mixture generator and the internal combustion engine.

19. The internal combustion engine system according to claim 10, wherein a surge tank is provided between the junction and the air-fuel mixture generator.

20. The internal combustion engine system according to claim 10, wherein the air-fuel mixture includes hydrogen generated by the reformer, the compressed air, and the fuel gas, and
a ratio between the compressed air and the fuel gas included in the air-fuel mixture is lower than a theoretical air-fuel ratio.

* * * * *